Oct. 1, 1963 W. K. MILLER 3,105,462
FARROWING CRATE
Filed Jan. 3, 1961 2 Sheets-Sheet 1

INVENTOR
WAYNE K. MILLER
BY Talbert Dick & Barley
ATTORNEYS

WITNESS
NORMAN G. TRAVISS

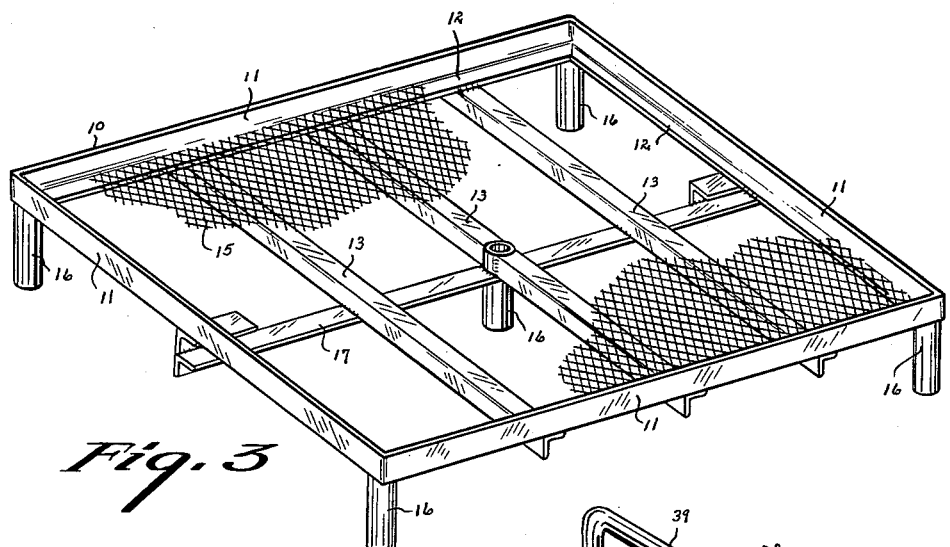
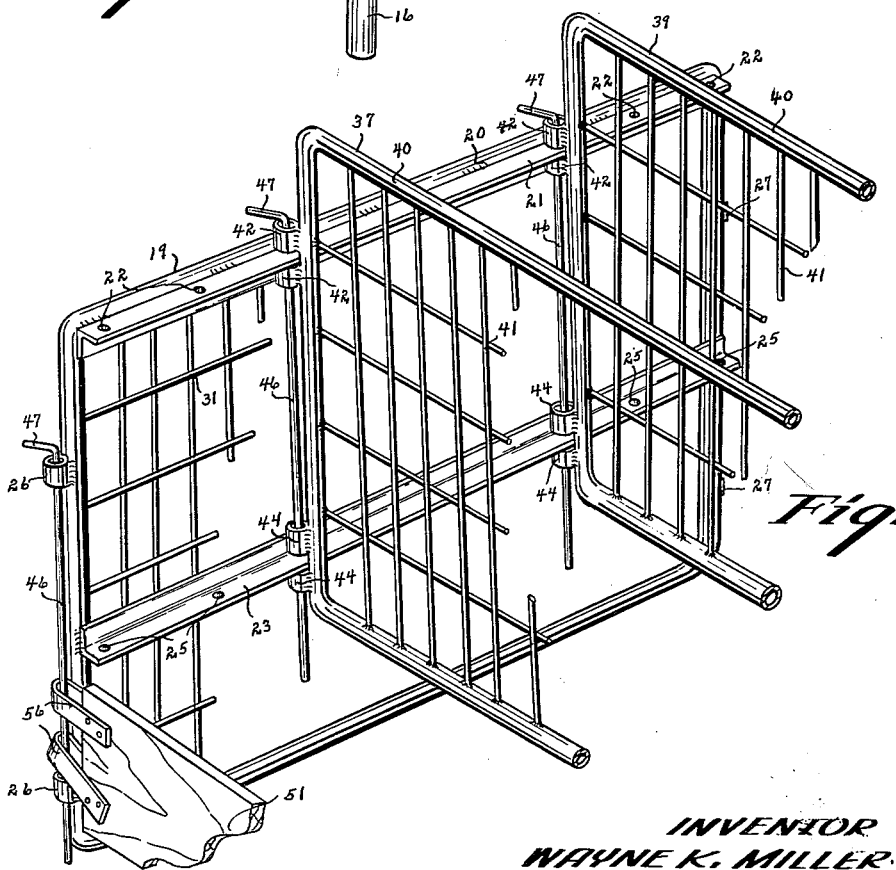

3,105,462
FARROWING CRATE
Wayne K. Miller, Neligh, Nebr.
Filed Jan. 3, 1961, Ser. No. 80,104
8 Claims. (Cl. 119—20)

This invention relates to compartments for animals such as hogs and more particularly to a farrowing crate for a sow and her baby pigs.

The raising of swine has always been beset with problems and hazards. The national loss average of baby pigs is from two to three pigs per litter. Much of this loss is due to the absence of an escape path for the small pigs when the sow lies down. Another problem is the treatment of the sow during this phase. A still further problem is one of sanitation.

Therefore, one of the principal objects of my invention is to provide a farrowing crate or pen that may be erected from that of a folded condition quickly, easily, and without the use of tools.

A further object of this invention is to provide a farrowing crate that may be easily and quickly adjusted to provide more or less room for the sow.

A further object of this invention is to provide a farrowing crate that cannot be upset by the hog using it.

A still further object of this invention is to provide a hog crate for sows that prevents the hog from turning around in the crate.

A still further object of my invention is to provide a farrowing crate that may be adjusted to accommodate baby pigs of different sizes.

A still further object of this invention is to provide a farrowing crate that is easily transported.

Still further objects of my invention are to provide a hog farrowing crate that is durable in use, economical in manufacture, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 3 is a perspective view of the lower base portion of my farrowing crate; and FIG. 4 is a perspective view of the inside end portion of my farrowing crate and more fully illustrates its construction.

Figure 1:
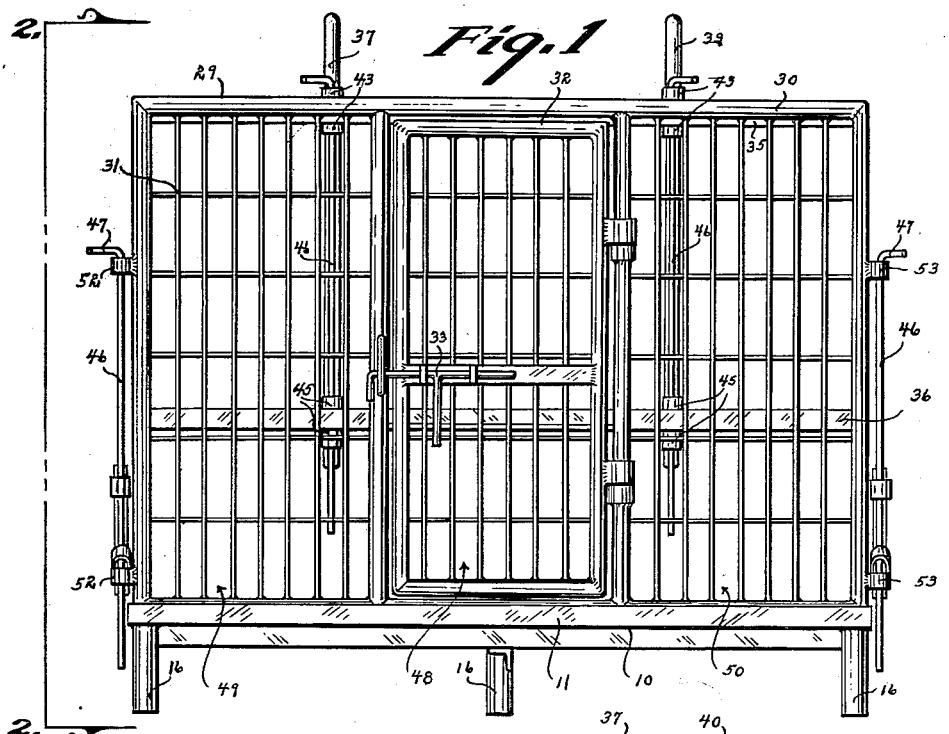
FIG. 1 is a front view of my farrowing crate erected and ready for use.

In these drawings I have used the numeral 10 to generally designate the base frame portion of the device. The frame is made of angle iron having a vertical outside wall 11 and an inwardly extending horizontal ledge 12 as shown in FIG. 3. This frame 10 has a plurality of horizontal cross bars 13 for supporting a flooring such as a metal grate or grid 15. The edges of the flooring 15 are supported by the horizontal ledge 12 of the frame 10. The entire unit is supported and elevated by a plurality of legs 16 as shown in FIG. 1. The cross bars 13 may be further strengthened by a brace beam 17. It is upon such a base unit that I erect the wall portions of my farrowing crate and which I will now describe in detail.

The rear end wall frame is generally designated by the numeral 19. This rear end wall 19 has a rectangular pipe frame 20, the width of which is substantially that of the inside width of the frame 10 in order that it will fit into the rear end of the frame 10 and rest on the ledge 12. The vertical wall 11 of the frame 10 limits the outward movement of the member 20 from the base support. The numeral 21 designates a horizontal bar secured to the inside of the top of the pipe frame 20 as shown in FIG. 4 and having a plurality of vertical holes 22. The numeral 23 designates a similar horizontal bar secured to the side members of the pipe frame 20, positioned substantially below the horizontal bar 21, and having a plurality of vertical holes 25. On the left side of the pipe frame 20 are two spaced apart vertical holed bearings 26 with the lowermost one positioned near the bottom of the pipe frame. Similar vertical holed bearings 27 are on the right side of the pipe frame 20.

Figure 2:
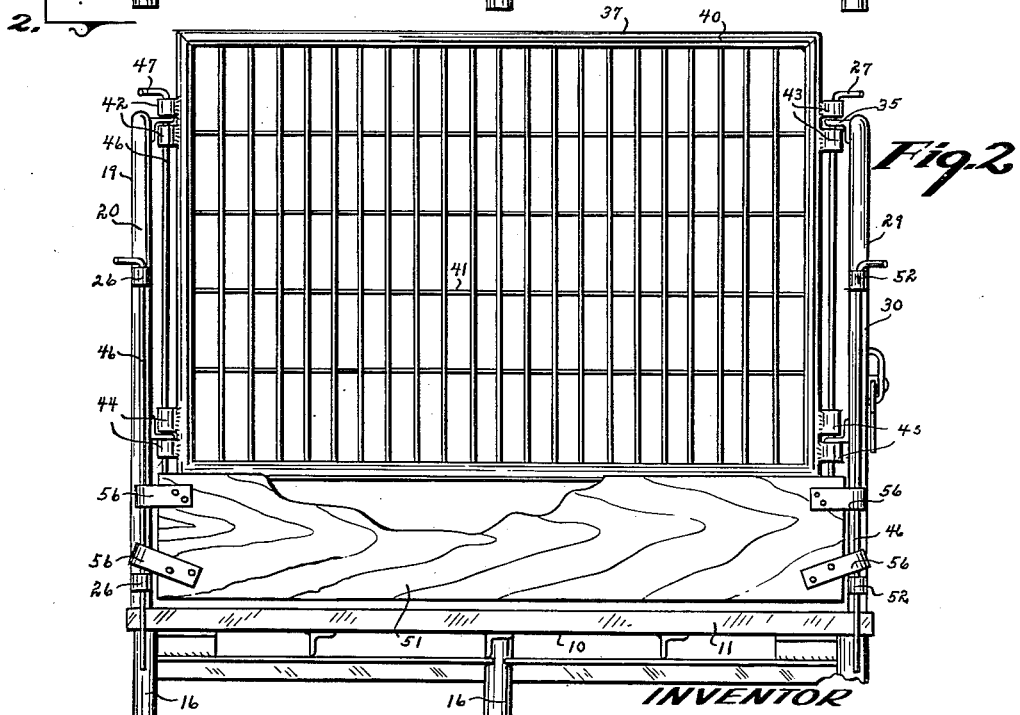
FIG. 2 is a side view of my device ready for use.

The front end wall is generally designated by the numeral 29 and also has a rectangular pipe frame 30. This pipe frame 30 is of a width substantially that of the inside width of the base 10 so that it is lower and may extend into the frame 10 and rest on the forward ledge 12 of the frame as shown in FIG. 1. The forward vertical wall 11 of the frame 10 prevents the outward movement of the pipe frame 30 from the base. Both the pipe frame 20 and the pipe frame 30 have grid bars 31. Mounted in the center of the pipe frame 30 is a hinged door means 32. This door is held in a closed position by any suitable means such as the latch 33. Secured to the inside top of the pipe frame 30 is a horizontal bar 35 having vertical holes such as that of the bar 21. The numeral 36 designates a second horizontal bar secured to the side members of the pipe frame 30, positioned substantially below the bar 35, and having a plurality of vertical holes such as that of the bar 23. The two side walls are generally designated by the numerals 37 and 39, respectively. These two side walls are duplicates of each other. Each consists of a rectangular pipe frame 40 enclosed by a bar grid 41 as shown in FIG. 4. Also both frames 40 have a pair of spaced apart holed bearings 42 at their upper rear ends, a pair of spaced apart vertical holed bearings 43 at their upper forward ends, a pair of spaced apart vertical holed bearings 44 at their lower rear ends, and a pair of spaced apart vertical holed bearings 45 at their lower forward ends as shown in FIG. 2. The distance between the bearings 42 and 44 is such that the upper bearing 42 will extend above the bar 21, the lower bearing 42 will extend under the bar 21 and the upper bearing 44 will extend above the bar 23 with the lower bearing 44 extending under the bar 23. In the same manner the upper bearing 43 will extend above the bar 35, the lower bearing 43 will extend below the bar 35 and the upper bearing 45 will extend above the bar 36 with the lower bearing 45 extending under the bar 36. Obviously, when the sides 37 and 39 are secured to the rear end 19 and front end 29, all the walls of the crate will be rigidly secured together in a rectangular formation. I secure the sides to the two end members by the use of detachable rods 46 each of which has its upper end bent at a right angle to form a handle portion 47. To attach the rear ends of the two side frames to the rear end 19, a rod 46 is threaded downwardly through the bearings 42 and 44 and selectively through holes 22 of the bar 21 and holes 25 of the bar 23 as shown in FIG. 4. The rods are prevented from sliding through the bearings by the bent handle portions 47 of the two rods 46. To secure the forward ends of the two sides 37 and 39 to the front end 29, two rods 46 are passed through the bearings 43 and 45 and selectively through the holes in the bars 35 and 36 as shown in FIG. 1. By selecting the holes of the bars 21, 23, 35 and 36, the two side frames 37 and 39 may be easily and quickly adjusted for bringing them closer together or farther apart. This will depend a great deal upon the size of the sow, number of pigs in the litter or like. It will be noted, however, that the bottoms of the side frames 37 and 39 terminate a substantial distance above the flooring 15 to permit the free movement of the baby pigs out of and into the central compartment 48 which is designed to contain the sow. These distances between the flooring 15 and the bottoms of the side walls are such as to prevent the sow from leaving the compartment 48. Inasmuch as the compartment 48 is centrally located, there will be a floor area or compartment for the baby pigs at each side of the sow's compartment 48 and I have designated these two compartments by the numerals 49 and 50, respectively. Each compartment is enclosed at its outer side by a board or like member 51. On the left side of the front 29 are two spaced apart vertical holed bearings 52. On the right side of the front 29 are two spaced apart vertical holed bearings 53. The lowermost bearings 52 and 53 are near the frame 10. Each board 51 has one or more loops 56 at each of its ends. To detachably hold the left board or like 51 in position, a rod 46 is passed downwardly through the bearings 26, through the adjacent loops 56 and a rod 46 is passed downwardly through the bearings 52 and adjacent loops 56 as shown in FIG. 2. To detachably secure the right side board or like 51 in position, a rod 46 is passed downwardly through the bearings 27, through the adjacent loops 56 and a rod 46 is passed downwardly through the bearings 53 and adjacent loops 56. By the boards 51 being of relatively small widths relative to the sides 37 and 39, the user may easily and handily pick up or deposit the baby pigs from or into the compartments 49 and 50.

To disassemble my farrowing crate it is merely necessary to remove all of the rods 46. With the rods removed, all units are released from each other. The farrowing crate may be as easily assembled and when all of the rods 46 are in place and the ends and sides on and in the frame 10, a most rigid structure is obtained.

Some changes may be made in the construction and arrangement of my farrowing crate without departing from the real spirit and purpose of my invention, and it is my intention to cover by my claims, any modified forms of structure or use of mechanical equivalents which may be reasonably included within their scope.

I claim:

1. In a farrowing crate, a rectangular base frame member of angle iron having an inwardly extending continuous horizontal ledge and a continuous vertical wall, a rear end member detachably resting on the ledge of the rear end of said frame member, a forward end member detachably resting on the ledge of the forward end of said frame member, two spaced apart horizontal bar members on the inner side of each of said end members; each of said bars having a plurality of vertical holes, two side members extending between said two end members and each having a plurality of vertical holed bearing members adjacent each end member and rods slidably detachably extending through the bearing members of each of said side members and selectively through the holes in the bar members on said rear and forward end members; said two side members terminating a distance above the plane of said base frame for the egress and ingress of baby pigs.

2. In a farrowing crate, a rectangular base frame member of angle iron having an inwardly extending continuous horizontal ledge and a continuous vertical wall, a rear end member detachably resting on the ledge of the rear end of said frame member, a forward end member detachably resting on the ledge of the forward end of said frame member, two spaced apart horizontal bar members on the inner side of each of said end members; each of said bars having a plurality of vertical holes, two side members extending between said two end members and each having a plurality of vertical holed bearing members adjacent each end member and rods slidably detachably extending through the bearing members of each of said side members and selectively through the holes in the bar members on said rear and forward end members; said two side members terminating a distance above the plane of said base frame for the egress and ingress of baby pigs; said holes in said bars being of sufficient number to permit the adjustable positioning of said two side members further apart from each other or closer together.

3. In a farrowing crate, a rectangular base frame member of angle iron having an inwardly extending continuous horizontal ledge and a continuous vertical wall, a perforated floor means in said base frame, a rear end member detachably resting on the ledge of the rear end of said frame member, a forward end member detachably resting on the ledge of the forward end of said frame member, two spaced apart horizontal bar members on the inner side of each of said end members; each of said bars having a plurality of vertical holes, two side members extending between said two end members and each having a plurality of vertical holed bearing members adjacent each end member and rods slidably detachably extending through the bearing members of each of said side members and selectively through the holes in the bar members on said rear and forward end members; said two side members terminating a distance above the plane of said base frame for the egress and ingress of baby pigs; said holes in said bars being of sufficient number to permit the adjustable positioning of said two side members further apart from each other or closer together.

4. In a farrowing crate, a rectangular base frame member of angle iron having an inwardly extending continuous horizontal ledge and a continuous vertical wall, a perforated floor means in said base frame, a rear end member detachably resting on the ledge of the rear end of said frame member, a forward end member detachably resting on the ledge of the forward end of said frame member, two spaced apart horizontal bar members on the inner side of each of said end members; each of said bars having a plurality of vertical holes, two side members extending between said two end members and each having a plurality of vertical holed bearing members adjacent each end member and rods slidably detachably extending through the bearing members of each of said side members and selectively through the holes in the bar members on said rear and forward end members; said two side members terminating a distance above the plane of said base frame for the egress and ingress of baby pigs; said holes in said bars being of sufficient number to permit the adjustable positioning of said two side members further apart from each other or closer together, a baby pig retaining wall adjacent said floor means and extending from the outer left side of said rear end member to the outer left side of said forward end member, and a baby pig retaining wall adjacent said floor means and extending from the outer right side of said rear end member to the outer right side of said forward end member.

5. In a farrowing crate, a substantially rectangular base frame of four sides, each of said sides having a horizontal ledge and a vertical wall extending upwardly on the outside of each ledge, front and rear end wall members of substantially the same width as the inside distance between the vertical walls on a first pair of opposite sides of said base frame, two side wall members of substantially the same width as the inside distance between the vertical walls on a second pair of opposite sides of said base frame, said front and rear end walls being adapted to rest upon the horizontal ledge of said first pair of opposite sides, and means for detachably joining said side wall members to said front and end wall members to form a four-sided enclosure resting upon at least two of the horizontal ledges of the sides of said base frame and retained by the vertical walls on the sides thereof.

6. In a farrowing crate, a substantially rectangular base frame of four sides, each of said sides having a horizontal ledge and a vertical wall extending upwardly on the outside of each ledge, legs supporting said base frame above a surface upon which said legs rest, a floor member on said base member, front and rear end wall members of substantially the same width as the inside distance between the vertical walls on a first pair of opposite sides of said base frame, two side wall members of substantially the same width as the inside distance between the vertical walls on a second pair of opposite sides of said base frame, said front and rear end walls being adapted to rest upon the horizontal ledge of said first pair of opposite sides, and means for detachably joining said side wall members to said front and end wall members to form a four-sided enclosure resting upon at least two of the horizontal ledges of the sides of said base frame and retained by the vertical walls on the sides thereof.

7. In a farrowing crate, a substantially rectangular base frame of four sides, each of said sides having a horizontal ledge and a vertical wall extending upwardly on the outside of each ledge, legs supporting said base frame above a surface upon which said legs rest, a floor member on said base member, front and rear end wall members of substantially the same width as the inside distance between the vertical walls on the first pair of opposite sides of said base frame, at least two spaced apart horizontal bar members on the inner side of each of said end wall members, each of said bar members having a plurality of vertical holes therein, two side members of substantially the same width as the inside distance between the vertical walls on a second pair of opposite sides of said base frame, a plurality of vertically holed bearing members on each end of said side wall members, and rods slidably detachably extending through the bearing members of each of said side wall members and selectively through the holes of said bar members to join said side wall members to said front and end wall members thereby forming a four-sided enclosure resting upon at least two of the horizontal ledges of the sides of said base frame and retained by the vertical walls on the sides thereof.

8. In a farrowing crate, a substantially rectangular base frame of four sides, each of said sides having a horizontal ledge and a vertical wall extending upwardly on the outside of each ledge, legs supporting said base frame above a surface upon which said legs rest, a floor member on said base member, front and rear end wall members of substantially the same width as the inside distance between the vertical walls on the first pair of opposite sides of said base frame, at least two spaced apart horizontal bar members on the inner side of each of said end wall members, each of said bar members having a plurality of vertical holes therein, two side members of substantially the same width as the inside distance between the vertical walls on a second pair of opposite sides of said base frame, a plurality of vertically holed bearing members on each end of said side wall members, and rods slidably detachably extending through the bearing members of each of said side wall members and selectively through the holes of said bar members to join said side wall members to said front and end wall members thereby forming a four-sided enclosure resting upon at least two of the horizontal ledges of the sides of said base frame and retained by the vertical walls on the sides thereof; said two side wall members having their lower edges spaced a distance above the plane of said base frame to permit the egress and ingress of baby pigs to and from said four-sided enclosure.

References Cited in the file of this patent
UNITED STATES PATENTS

| | | |
|---|---|---|
| 809,543 | Vail | Jan. 9, 1906 |
| 2,764,127 | Newman | Sept. 25, 1956 |
| 2,928,371 | Baker | Mar. 15, 1960 |